(12) United States Patent
Yang et al.

(10) Patent No.: US 10,253,667 B2
(45) Date of Patent: Apr. 9, 2019

(54) EXHAUST GAS TREATMENT SYSTEM

(71) Applicant: BASF CORPORATION, Florham Park, NJ (US)

(72) Inventors: Xiaofan Yang, Highland Park, NJ (US); Wen-Mei Xue, Dayton, NJ (US); John K. Hochmuth, Raritan, NJ (US); Matthew J. Schladt, Princeton Junction, NJ (US); Yuejin Li, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 15/555,117

(22) PCT Filed: Mar. 24, 2016

(86) PCT No.: PCT/US2016/023926
§ 371 (c)(1),
(2) Date: Sep. 1, 2017

(87) PCT Pub. No.: WO2016/154391
PCT Pub. Date: Sep. 29, 2016

(65) Prior Publication Data
US 2018/0038252 A1     Feb. 8, 2018

Related U.S. Application Data

(60) Provisional application No. 62/138,689, filed on Mar. 26, 2015.

(51) Int. Cl.
*F01N 3/08*     (2006.01)
*B01J 23/46*     (2006.01)
(Continued)

(52) U.S. Cl.
CPC ........ *F01N 3/0814* (2013.01); *B01D 53/945* (2013.01); *B01D 53/9418* (2013.01);
(Continued)

(58) Field of Classification Search
CPC   B01D 53/94; B01D 53/9418; B01D 53/9422; B01D 53/9445; B01D 53/9477;
(Continued)

(56) References Cited

U.S. PATENT DOCUMENTS

| 5,516,497 A | 5/1996 | Speronello et al. |
| 7,562,522 B2 * | 7/2009 | Yan .................... B01D 53/9418 60/286 |

(Continued)

FOREIGN PATENT DOCUMENTS

KR    2017 0132161 A   * 12/2017     ......... B01D 53/9477

OTHER PUBLICATIONS

International Search Report dated Jun. 27, 2016.
Written Opinion dated Jun. 27, 2016.
European Search Report dated Oct. 9, 2018.

*Primary Examiner* — Timothy C Vanoy
(74) *Attorney, Agent, or Firm* — Baltazar Gomez

(57) ABSTRACT

Described are exhaust gas treatment systems for treatment of a gasoline engine exhaust gas stream containing NOx, particulate matter, and sulfur. The exhaust gas treatment system comprises: one or more catalytic articles selected from a three-way conversion catalyst (TWC), a lean NOx trap (LNT), and an integrated LNT-TWC; a platinum-containing catalytic article downstream from the one or more catalytic articles; and one or more selective catalytic reduction (SCR) catalytic articles immediately downstream from the platinum-containing catalytic article, the one or
(Continued)

more SCR catalytic articles including a molecular sieve. The system stabilizes the SCR catalytic article from poisoning by sulfur.

27 Claims, 5 Drawing Sheets

(51) Int. Cl.
- *B01J 29/76* (2006.01)
- *B01J 35/00* (2006.01)
- *F01N 13/00* (2010.01)
- *B01D 53/94* (2006.01)
- *F01N 3/10* (2006.01)
- *F01N 3/20* (2006.01)
- *F01N 3/035* (2006.01)
- *B01J 23/44* (2006.01)
- *B01J 35/04* (2006.01)
- *B01J 23/40* (2006.01)
- *B01J 23/42* (2006.01)
- *B01J 29/04* (2006.01)
- *B01J 29/072* (2006.01)

(52) U.S. Cl.
CPC ..... *B01D 53/9422* (2013.01); *B01D 53/9463* (2013.01); *B01D 53/9477* (2013.01); *B01J 23/40* (2013.01); *B01J 23/42* (2013.01); *B01J 23/44* (2013.01); *B01J 23/464* (2013.01); *B01J 29/04* (2013.01); *B01J 29/072* (2013.01); *B01J 29/763* (2013.01); *B01J 35/0006* (2013.01); *B01J 35/04* (2013.01); *F01N 3/035* (2013.01); *F01N 3/0821* (2013.01); *F01N 3/0842* (2013.01); *F01N 3/101* (2013.01); *F01N 3/2066* (2013.01); *F01N 13/0093* (2014.06); *F01N 13/0097* (2014.06); *B01D 53/944* (2013.01); *B01D 53/9445* (2013.01); *B01D 2255/1021* (2013.01); *B01D 2255/1023* (2013.01); *B01D 2255/20761* (2013.01); *B01D 2255/50* (2013.01); *B01D 2255/904* (2013.01); *B01D 2255/9155* (2013.01); *B01D 2258/014* (2013.01); *F01N 2370/02* (2013.01); *Y02T 10/22* (2013.01); *Y02T 10/24* (2013.01)

(58) Field of Classification Search
CPC .......... B01D 2258/01; B01D 2258/012; F01N 3/101; F01N 3/105; F01N 3/2066; F01N 13/609; F01N 2250/12
See application file for complete search history.

(56) References Cited

U.S. PATENT DOCUMENTS

| | | | |
|---|---|---|---|
| 8,468,803 B2* | 6/2013 | Armanini | F01N 3/2066 422/180 |
| 8,539,760 B2* | 9/2013 | Li | B01D 53/9422 422/171 |
| 2007/0277507 A1* | 12/2007 | Yan | B01D 53/9418 60/286 |
| 2009/0193796 A1* | 8/2009 | Wei | B01D 53/9445 60/297 |
| 2010/0050604 A1 | 3/2010 | Hoard et al. | |
| 2011/0274606 A1 | 11/2011 | Melville et al. | |
| 2014/0109553 A1 | 4/2014 | Roberts et al. | |
| 2014/0248200 A1* | 9/2014 | Wan | B01D 53/9472 423/212 |
| 2014/0322113 A1 | 10/2014 | Blakeman et al. | |

* cited by examiner

EXHAUST GAS TREATMENT SYSTEM

This application is a national stage of PCT/US2016/023926, filed Mar. 24, 2016 which takes the benefit of U.S. Provisional Application No. 62/138,689 filed Mar. 26, 2015 the contents of which are incorporated entirely by reference.

TECHNICAL FIELD OF THE INVENTION

The present invention relates generally to the field of gasoline engine exhaust after-treatment systems.

BACKGROUND OF THE INVENTION

Exhaust gas from vehicles powered by gasoline engines is typically treated with one or more three-way conversion (TWC) automotive catalysts, which are effective to abate $NO_x$, carbon monoxide (CO), and hydrocarbon (HC) pollutants in the exhaust of engines operated at or near stoichiometric air/fuel conditions. The precise proportion of air to fuel which results in stoichiometric conditions varies with the relative proportions of carbon and hydrogen in the fuel. An air-to-fuel (A/F) ratio of 14.65:1 (weight of air to weight of fuel) is the stoichiometric ratio corresponding to the combustion of a hydrocarbon fuel, such as gasoline, with an average formula $CH_{1.88}$. The symbol $\lambda$ is thus used to represent the result of dividing a particular A/F ratio by the stoichiometric A/F ratio for a given fuel, so that; $\lambda=1$ is a stoichiometric mixture, $\lambda>1$ is a fuel-lean mixture and $\lambda<1$ is a fuel-rich mixture.

Gasoline engines having electronic fuel injection systems provide a constantly varying air-fuel mixture that quickly and continually cycles between lean and rich exhaust. Recently, to improve fuel-economy, gasoline-fueled engine are being designed to operate under lean conditions. Lean conditions refers to maintaining the ratio of air to fuel in the combustion mixtures supplied to such engines above the stoichiometric ratio so that the resulting exhaust gases are "lean," i.e., the exhaust gases are relatively high in oxygen content. Lean burn gasoline direct injection (GDI) engines offer fuel efficiency benefits that can contribute to a reduction in greenhouse gas emissions carrying out fuel combustion in excess air. A major by-product of lean combustion is $NO_x$, the after-treatment of which remains a major challenge.

Emission of nitrogen oxides ($NO_x$) must be reduced to meet emission regulation standards. TWC catalysts are not effective for reducing $NO_x$ emissions when the gasoline engine runs lean because of excessive oxygen in the exhaust. Two of the most promising technologies for reducing $NO_x$ under an oxygen-rich environment are urea selective catalytic reduction (SCR) and the lean $NO_x$ trap (LNT).

Urea SCR systems require a secondary fluid tank with an injection system, resulting in added system complexity. Other concerns for urea SCR include urea infrastructure, the potential freezing of urea solution, and the need for drivers to periodically fill the urea solution reservoir.

The exhaust of gasoline engines can be treated with a catalyst/$NO_x$ sorbent that contain alkali or alkali earth components (Ba, K, etc.), which stores $NO_x$ during periods of lean (oxygen-rich) operation, and releases the stored $NO_x$ during the rich (fuel-rich) periods of operation. During periods of rich (or stoichiometric) operation, the catalyst component of the catalyst/$NO_x$ sorbent promotes the reduction of $NO_x$ to nitrogen by reaction of $NO_x$ (including $NO_x$ released from the $NO_x$ sorbent) with HC, CO, and/or hydrogen present in the exhaust. However, the $NO_x$ absorbing components also react readily with sulfur oxides in the exhaust to form more stable metal sulfates, thus reducing the $NO_x$ storage capacity. Treatments in a reducing environment at high temperatures (>650° C.) are required to remove the sulfur from LNT catalysts and recover the $NO_x$ storage capacity.

FIG. 1 shows an exemplary engine exhaust system configuration often used in gasoline engines of the prior art. Specifically, FIG. 1 shows an engine exhaust system 100 comprising a TWC catalyst 120 downstream from a gasoline engine 110 via an exhaust conduit 115, an optional gasoline particulate filter 130 downstream from the TWC catalyst 120 via an exhaust conduit 125, and a SCR catalytic article 140 downstream from the TWC catalyst 120 and the optional gasoline particulate filter 130 via an exhaust conduit 135. The gasoline particulate filter 130 can be catalyzed with one or more platinum group metals, specifically palladium and rhodium.

To meet current governmental emissions regulations, there is a need for a technology that addresses $NO_x$ emissions and the sulfur poisoning of SCR catalysts in gasoline engine applications.

SUMMARY OF THE INVENTION

A first aspect of the present invention relates to an exhaust gas treatment system for treatment of a gasoline engine exhaust gas stream. In a first embodiment, an exhaust gas system for treatment of a gasoline engine exhaust gas stream containing $NO_x$, particulate matter, and sulfur, comprises: at least one catalytic article selected from a three-way conversion (TWC) catalyst, a lean $NO_x$ trap (LNT), and an integrated LNT-TWC; a platinum-containing catalytic article downstream from the at least one catalytic article; and a selective catalytic reduction (SCR) catalytic article immediately downstream from the platinum-containing catalytic article, the SCR catalytic article including a molecular sieve.

In a second embodiment, the exhaust gas system of the first embodiment is modified, wherein the at least one catalytic article consists of a TWC catalyst.

In a third embodiment, the exhaust gas system of the first embodiment if modified, wherein the at least one catalytic article consists of an LNT.

In a fourth embodiment, the exhaust gas system of the first embodiment is modified, wherein the at least one catalytic article includes a TWC catalyst and an LNT.

In a fifth embodiment, the exhaust gas system the fourth embodiment is modified, wherein the LNT and TWC are integrated on a single substrate.

In a sixth embodiment, the exhaust gas system of any of the first through fifth embodiments is modified, wherein the at least one catalytic article and the platinum containing catalytic article are on a single substrate.

In a seventh embodiment, the exhaust gas system of any of the first through fifth embodiments is modified, wherein the platinum-containing catalyst is on a particulate filter.

In an eighth embodiment, the exhaust gas system of the seventh embodiment is modified, wherein the particulate filter is a wall-flow filter.

In a ninth embodiment, the exhaust gas system of any of the first through fifth embodiments is modified, wherein the platinum-containing catalyst is on a flow through substrate.

A second aspect of the present invention is directed to an exhaust gas system for treatment of a gasoline engine exhaust gas stream. In a tenth embodiment, an exhaust gas system for treatment of a gasoline engine exhaust gas stream containing $NO_x$, particulate matter and sulfur, comprises: a three-way conversion (TWC) catalyst; a catalyzed soot filter containing platinum downstream from the TWC catalyst; a first selective catalytic reduction (SCR) catalytic article immediately downstream from the catalyzed soot filter; and a second selective catalytic reduction catalyst (SCR) immediately downstream from the first SCR catalytic article; wherein the first and second SCR catalytic articles each independently include a molecular sieve.

In an eleventh embodiment, the exhaust gas system of any of the first through eighth embodiments is modified, wherein the platinum-containing catalytic article further comprises an additional platinum group metal (PGM) selected from Pd, Rh, Ru, Ir, and Os, and wherein the platinum is present in an amount of at least 50 wt. % of the total PGM in the platinum-containing catalytic article.

In a twelfth embodiment, the exhaust gas system of any of the first through eighth embodiments is modified, further comprising an ammonia oxidation (AMOx) catalyst downstream of the SCR catalytic article.

In a thirteenth embodiment, the exhaust gas system of the first embodiment is modified, wherein the SCR catalytic article is on a substrate having an inlet and an outlet, and includes an ammonia oxidation catalyst (AMOx) at the outlet.

In a fourteenth embodiment, the exhaust gas system of any of the first through thirteenth embodiments is modified, wherein the gasoline engine is a lean gasoline direct injection (GDI) engine.

In a fifteenth embodiment, the exhaust gas treatment system of any of the first through eighth embodiments is modified, wherein the at least one catalytic article generates $NH_3$ when the exhaust gas is rich.

In a sixteenth embodiment, the exhaust gas treatment system of the eleventh embodiment is modified, wherein the additional platinum group metal is palladium.

In a seventeenth embodiment, the exhaust gas treatment system of any of the first through tenth embodiments is modified, wherein the molecular sieve is a molecular sieve that has a double six-ring (d6r) unit.

In an eighteenth embodiment, the exhaust gas system of any of the first through seventeenth embodiments is modified, wherein the molecular sieve is selected from the group consisting of the framework type AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof.

In a nineteenth embodiment, the exhaust gas treatment system of any of the first through eighteenth embodiments is modified, wherein the molecular sieve is selected from the group consisting of the framework type AEI, AFT, AFX, CHA, EAB, ERI, KFI, LEV, SAS, SAT, and SAV.

In a twentieth embodiment, the exhaust gas treatment system of any of the first through nineteenth embodiments is modified, wherein the molecular sieve is selected from the group consisting of the framework type AEI, CHA, and AFX.

In a twenty-first embodiment, the exhaust gas treatment system of any of the first through twentieth embodiments is modified, wherein the molecular sieve is the CHA framework type.

In a twenty-second embodiment, the exhaust gas treatment system of the twenty-first embodiment is modified, wherein the CHA framework type molecular sieve is selected from an aluminosilicate zeolite, a borosilicate, a gallosilicate, a SAPO, an AlPO, a MeAPSO, and a MeAPO.

In a twenty-third embodiment, the exhaust gas treatment system of either of the twenty-first and twenty-second embodiments is modified, wherein the CHA framework type molecular sieve is selected from the group consisting of SSZ-13, SSZ-62, chabazite, zeolite K-G, Linde D, Linde R, LZ-218, LZ-235, LZ-236, ZK-14, SAPO-34, SAPO-44, SAPO-47, and ZYT-6.

In a twenty-fourth embodiment, the exhaust gas treatment system of any of the first through twenty-first embodiments is modified, wherein the molecular sieve is selected from SSZ-13 and SSZ-62.

In a twenty-fifth embodiment, the exhaust gas treatment system of any of the first through twenty-fourth embodiments is modified, wherein the molecular sieve is promoted with a metal selected from Cu, Fe, Co, Ni, La, Ce, Mn, V, Ag, and combinations thereof.

In a twenty-sixth embodiment, the exhaust gas treatment system of any of the first through twenty-fifth embodiments is modified, wherein the molecular sieve is promoted with a metal selected from Cu, Fe, and combinations thereof.

In a twenty-seventh embodiment, the exhaust gas treatment system of any of the first through twenty-sixth embodiments is modified, wherein the molecular sieve is promoted with Cu.

A third aspect of the present invention is directed to a method for treatment of an engine exhaust gas stream of a lean burn engine. In a twenty-eighth embodiment, a method for treatment of an engine exhaust gas stream of a lean burn engine containing particulate matter, ammonia, $NO_x$, and sulfur is provided, wherein the method comprises: flowing the engine exhaust gas stream over at least one catalytic article selected from a three-way conversion (TWC) catalyst, a lean $NO_x$ trap (LNT), and an integrated LNT-TWC; directing the exhaust gas stream exiting the at least one catalytic article containing particulate matter, $NO_x$, sulfur, and ammonia through a platinum-containing catalytic article; and directing the exhaust gas exiting the platinum-containing catalytic article through an selective catalytic reduction (SCR) article including a molecular sieve and a promoter metal.

In a twenty-ninth embodiment, the method of the twenty-eighth embodiment is modified, wherein the at least one catalytic article consists of a TWC catalyst.

In a thirtieth embodiment, the method of either of the twenty-eighth and twenty-ninth embodiments is modified, wherein the molecular sieve comprises an aluminosilicate zeolite having a double six-ring (d6r) unit.

In a thirty-first embodiment, the method of the thirtieth embodiment is modified, wherein the zeolite is a CHA framework type zeolite promoted with copper.

DETAILED DESCRIPTION OF THE INVENTION

Before describing several exemplary embodiments of the invention, it is to be understood that the invention is not limited to the details of construction or process steps set forth in the following description. The invention is capable of other embodiments and of being practiced or being carried out in various ways.

Figure 1:
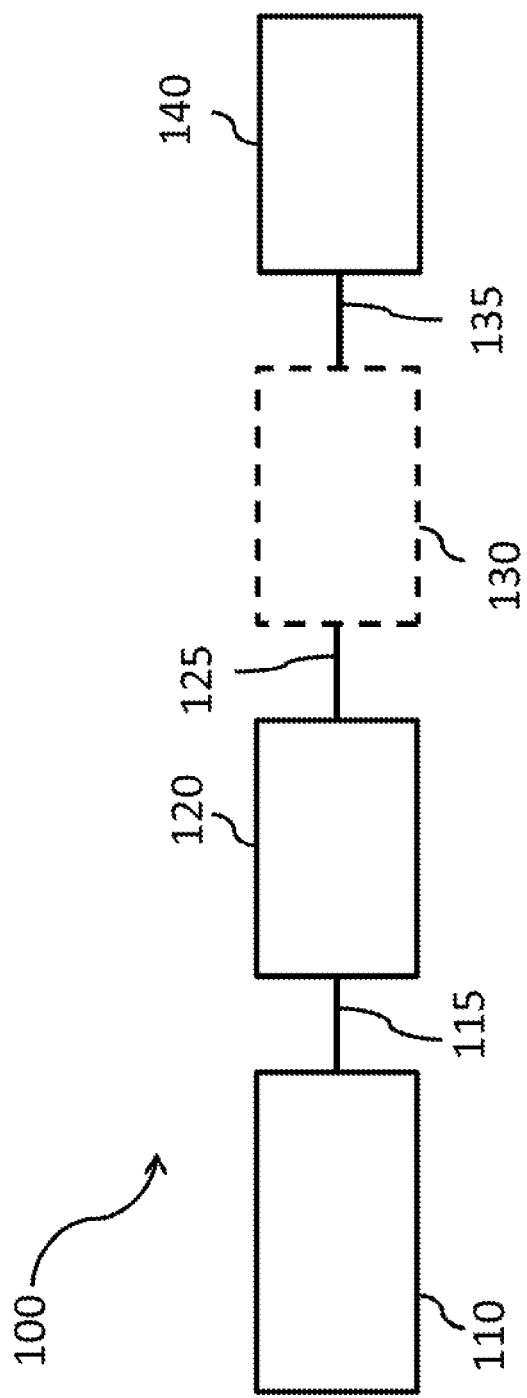
FIG. 1 is a diagram of an exhaust gas system configuration used in gasoline engines according to the prior art.

In gasoline exhaust treatment systems, such as those illustrated in FIG. 1, the performance of the SCR catalytic article 140 depends on the make-up of the fuel. Gasoline contains high amounts of sulfur, especially compared to the sulfur content of diesel fuel, and SCR catalysts are particularly sensitive to sulfur, limiting performance. Sulfur poisons the SCR catalyst, degrading the $NO_x$ removal performance of the catalyst.

Regeneration of a sulfated SCR catalyst requires temperatures of approximately 500° C. For gasoline engines, such high temperatures can only be achieved in rich cycles. Because running rich cycles negatively impacts the fuel economy of a vehicle, original equipment manufacturer (OEM) customers prefer systems that do not run rich for extended periods of time. Running lean improves fuel economy. Thermal regeneration of a sulfated SCR catalyst is, therefore, often inhibited by exhaust temperature, especially for lean GDI engine applications, which runs lean only at temperatures of about 250° C. Thus, over time, the $NO_x$ abatement performance of an SCR catalyst in such systems drops significantly.

It was surprisingly found that use of a platinum-containing catalytic article immediately upstream from one or more selective catalytic reduction (SCR) articles stabilizes the SCR catalytic article(s) against the deleterious effects of sulfur in the fuel and exhaust gas stream, and, at the same time, allows the SCR catalytic article(s) to effectively abate $NO_x$ emission. Thus, according to embodiments of the invention, provided is an exhaust gas system for treatment of a gasoline engine exhaust gas stream containing $NO_x$, particulate matter, and sulfur comprising: one or more catalytic articles selected from a three-way conversion (TWC) catalyst, a lean $NO_x$ trap (LNT), and an integrated LNT-TWC; a platinum-containing catalytic article downstream from the one or more catalytic articles; and one or more selective catalytic reduction (SCR) catalytic articles immediately downstream from the platinum-containing catalytic article, the one or more SCR catalytic articles including a molecular sieve.

Figure 2:
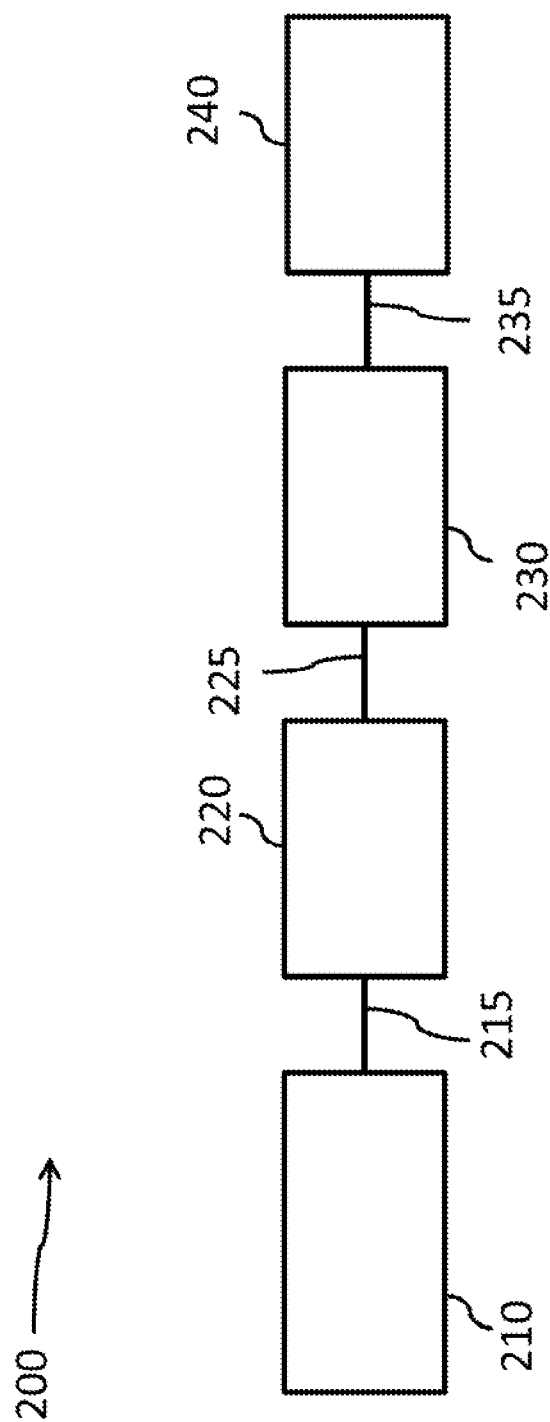
FIG. 2 is a diagram of an exemplary exhaust gas system configuration used in gasoline engines according one or more embodiments.

The exhaust gas treatment systems of embodiments of the invention may be more readily appreciated by reference to FIGS. 2 through 5. Referring to FIG. 2, an exemplary embodiment of an engine exhaust system 200 comprises one or more catalytic articles 220 selected from a TWC catalyst, a LNT, or an integrated LNT-TWC catalyst downstream from a gasoline engine 210 via an exhaust conduit 215, a platinum-containing catalytic article 230 downstream from the one or more catalytic articles 220 via an exhaust conduit 225, and one or more SCR catalytic articles 240 immediately downstream from the platinum-containing catalytic article 230 via an exhaust conduit 235. Details of the various components, including exemplary configurations and materials will now be described in detail. While FIG. 2 shows the platinum containing article 230 as a separate article downstream from the one or more catalytic articles 220, embodiments of the invention include embodiments in which the platinum containing catalyst can be on the same brick and near the outlet end of the one or more catalytic articles 220. Thus, as referred to in this specification, "downstream" refers to the fact that the platinum containing catalyst is located further from the engine.

With respect to the terms used in this disclosure, the following definitions are provided.

As used herein, the terms "catalyst" or "catalyst material" or "catalytic material" refer to a material that promotes a reaction.

As used herein, the term "catalytic article" refers to an element that is used to promote a desired reaction. For example, a catalytic article may comprise a washcoat containing a catalytic species, e.g. a catalyst composition, on a substrate, for example, a honeycomb substrate.

As used herein, the terms "layer" and "layered" refer to a structure that is supported on a surface, e.g. a substrate.

As used herein, the term "gasoline engine" refers to any internal combustion engine with spark-ignition designed to run on gasoline. In one or more specific embodiments, the engine is a lean gasoline direct injection engine. Gasoline direct injection (GDI) engines can have lean burn conditions and stratified combustion, resulting in the generation of particulates. In contrast to particulates generated by diesel lean burn engines, the particulates generated by GDI engines tend to be finer and in lesser quantities.

As used herein, the term "washcoat" has its usual meaning in the art of a thin, adherent coating of a catalytic or other material applied to a carrier substrate material, such as a honeycomb-type carrier member, which is sufficiently porous to permit the passage of the gas stream being treated. As is understood in the art, a washcoat is obtained from a dispersion of particles in slurry, which is applied to a substrate, dried and calcined to provide the porous washcoat.

As used herein, the term "stream" broadly refers to any combination of flowing gas that may contain solid or liquid particulate matter. The term "gaseous stream" or "exhaust gas stream" means a stream of gaseous constituents, such as the exhaust of an engine, which may contain entrained non-gaseous components such as liquid droplets, solid particulates, and the like. The exhaust gas stream of an engine typically further comprises combustion products, products of incomplete combustion, oxides of nitrogen, combustible and/or carbonaceous particulate matter (soot), and un-reacted oxygen and nitrogen.

One or More Catalytic Articles Selected from TWC Catalyst, LNT, Integrated LNT-TWC:

In one or more embodiments, the exhaust gas treatment system comprises one or more catalytic articles 220 (in FIG. 2) selected from a three-way conversion (TWC) catalyst, a lean $NO_x$ trap (LNT), and an integrated LNT-TWC.

In one or more embodiments, the one or more catalytic articles consists of a TWC. There are no specific requirements with respect to the TWC catalyst; any TWC catalyst known in the art can be utilized. In one or more embodiments, the TWC catalyst comprises a platinum group metal supported on an oxygen storage component and/or a refractory metal oxide support, and, optionally, an additional platinum group metal component supported on a second refractory metal oxide support or a second oxygen storage component.

As used herein, the terms "refractory metal oxide support" and "support" refer to the underlying high surface area material upon which additional chemical compounds or elements are carried. The support particles have pores larger than 20 Å and a wide pore distribution. As defined herein, such metal oxide supports exclude molecular sieves, specifically, zeolites. In particular embodiments, high surface area refractory metal oxide supports can be utilized, e.g., alumina support materials, also referred to as "gamma alumina" or "activated alumina," which typically exhibit a BET surface area in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa, and theta alumina phases. Refractory metal oxides other than activated alumina can be used as a support for at least some of the catalytic components in a given catalyst. For example, bulk ceria, zirconia, alpha alumina, silica, titania, and other materials are known for such use.

One or more embodiments of the present invention include a refractory metal oxide support comprising an activated compound selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, ceria, alumina-ceria, and combinations thereof. Although many of these materials suffer from the disadvantage of having a considerably lower BET surface area than activated alumina, that disadvantage tends to be offset by a greater durability or performance enhancement of the resulting catalyst. As used herein, the term "BET surface area" has its usual meaning of referring to the Brunauer, Emmett, Teller method for determining surface area by $N_2$ adsorption. Pore diameter and pore volume can also be determined using BET-type $N_2$ adsorption or desorption experiments.

In one or more embodiments, the refractory metal oxide supports independently comprise a compound that is activated, stabilized, or both, selected from the group consisting of alumina, zirconia, alumina-zirconia, lanthana-alumina, lanthana-zirconia-alumina, baria-alumina, baria-lanthana-alumina, baria-lanthana-neodymia-alumina, alumina-chromia, ceria, alumina-ceria, and combinations thereof.

As used herein, the term "oxygen storage component" (OSC) refers to an entity that has a multi-valence state and can actively react with reductants such as carbon monoxide (CO) or hydrogen under reduction conditions and then react with oxidants such as oxygen or nitrous oxides under oxidative conditions. Examples of suitable oxygen storage components comprise the rare earth oxides, particularly ceria. OSCs can also comprise one or more of lanthana, praseodymia, neodymia, niobia, europia, samaria, ytterbia, yttria, zirconia, and mixtures thereof in addition to ceria. The rare earth oxide may be in bulk (e.g. particulate) form. The oxygen storage component can include cerium oxide (ceria, $CeO_2$) in a form that exhibits oxygen storage properties. The lattice oxygen of ceria can react with carbon monoxide, hydrogen, or hydrocarbons under rich A/F conditions. Upon lean exposure, the reduced ceria has the ability to recapture oxygen from air and/or $NO_x$ species, thus promoting conversion of $NO_x$.

In one or more embodiments, the oxygen storage components comprise a ceria-zirconia composite or a rare earth-stabilized ceria-zirconia.

As used herein, the term "platinum group metal" or "PGM" refers to one or more chemical elements defined in the Periodic Table of Elements, including platinum (Pt), palladium (Pd), rhodium (Rh), osmium (Os), iridium (Ir), and ruthenium (Ru), and mixtures thereof. In one or more embodiments, the TWC catalyst comprises at least one platinum group metal supported on an oxygen storage component (OSC) and/or a refractory metal oxide support and, optionally, an additional platinum group metal supported on a second refractory metal oxide support or a second oxygen storage component. In one or more embodiments, the platinum group metal component is selected from platinum, palladium, rhodium, or mixtures thereof. In specific embodiments, the platinum group metal component comprises palladium. Generally, there are no specific restrictions as far as the palladium content of the TWC catalyst is concerned.

In one or more embodiments, the TWC catalyst does not comprise an additional platinum group metal. In other embodiment, the TWC catalyst comprises an additional platinum group metal. In one or more embodiments, when present, the additional platinum group metal is selected from platinum, rhodium, and mixtures thereof. In specific embodiments, the additional platinum group metal component comprises rhodium. Generally there are no specific restrictions as far as the rhodium content of the TWC catalyst is concerned. In one or more specific embodiments, the TWC catalyst comprises a mixture of palladium and rhodium. In other embodiments, the TWC catalyst comprises a mixture of platinum, palladium, and rhodium.

In one or more embodiments, the one or more catalytic articles 220 (in FIG. 2) consists of a LNT. There are no specific requirements with respect to the LNT; any LNT known in the art can be utilized. In a reducing environment, a lean $NO_x$ trap (LNT) activates reactions by promoting a steam reforming reaction of hydrocarbons and a water gas shift (WGS) reaction to provide $H_2$ as a reductant to abate $NO_x$. The water gas shift reaction is a chemical reaction in which carbon monoxide reacts with water vapor to form carbon dioxide and hydrogen. The presence of ceria in an LNT catalyzes the WGS reaction, improving the LNT's resistance to $SO_2$ deactivation and stabilizing the PGM. $NO_x$ storage (sorbent) components including alkaline earth metal oxides, such as oxides of Mg, Ca, Sr, and Ba, alkali metal oxides such as oxides of Li, Na, K, Rb, and Cs, and rare earth metal oxides such as oxides of Ce, La, Pr, and Nd in combination with platinum group metal catalysts such as platinum dispersed on an alumina support can be used in the purification of exhaust gas from an internal combustion engine. For $NO_x$ storage, barium oxide is usually preferred because it forms nitrates at lean engine operation and releases the nitrates relatively easily under rich conditions.

In one or more embodiments, the LNT comprises at least one platinum group metal component, and an alkaline earth metal supported on a rare earth oxide. In one or more embodiments, the rare earth oxide is selected from at least one oxide of a rare earth metal selected from Ce, Pr, Nd, Eu, Sm, Yb, and La, and mixtures thereof. In some embodiments, the rare earth oxide can be mixed with one or more other components such as lanthanum, praseodymium, neodymium, niobium, platinum, palladium, rhodium, iridium, osmium, ruthenium, tantalum, zirconium, hafnium, yttrium, nickel, manganese, iron, copper, silver, gold, gadolinium, and combinations thereof.

In one or more embodiments, the LNT comprises at least one platinum group metal, and an alkaline earth metal supported on a high surface area refractory metal. In one or more embodiments, the high surface area refractory metal oxide comprises any high surface area refractory metal oxide known in the art. For example, the high surface area refractory metal oxide can comprise one or more of alumina, zirconia, alumina-zirconia, lanthana-alumina, lanthana-zirconia-alumina, baria-alumina, baria-lanthana-alumina, baria-lanthana-neodymia-alumina, alumina-chromia, ceria, and alumina-ceria.

In one or more specific embodiments, the LNT comprises at least one platinum group metal support on a rare earth oxide-high surface area refractory metal oxide. In one or more embodiments, the rare earth oxide-high surface area refractory metal oxide comprises ceria-alumina.

In one or more embodiments, the one or more catalytic articles 220 (in FIG. 2) include both a TWC catalyst and a LNT. In such embodiments, the TWC catalyst can be upstream of the LNT, or, in other embodiments, the LNT can be upstream of the TWC. In one or more specific embodiments, the LNT is upstream of the TWC catalyst.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine. When a catalyst or catalyst zone is "downstream" or "upstream" from another catalyst or zone, it may be on a different substrate or brick or on a different region of the same substrate or brick.

In one or more embodiments, the one or more catalytic articles 220 (in FIG. 2) comprises an integrated LNT-TWC. According to one or more embodiments, the integrated LNT-TWC is a layered catalyst composite that balances TWC activity and LNT functionality. In lean operation, the integrated LNT-TWC catalyst composite allows for conversion of carbon monoxide (CO) and hydrocarbons (HC) and storage of $NO_x$. In rich operation, the integrated LNT-TWC catalyst composite is effective to convert CO and HC and to release and reduce $NO_x$. In stoichiometric operation, the integrated LNT-TWC catalyst composite allows for simultaneous conversion of CO, HC, and $NO_x$.

In one or more embodiments, the one or more catalytic articles 220 (in FIG. 2) selected from a TWC catalyst, a LNT, or an integrated LNT-TWC, generate ammonia ($NH_3$) when the exhaust gas is rich.

Platinum-Containing Catalytic Article:

Referring to FIG. 2, in one or more embodiments, the exhaust gas system comprises a platinum-containing catalytic article 230 downstream from the one or more catalytic articles 220 and immediately upstream of the one or more selective catalytic reduction articles 240. Without intending to be bound be theory, it is thought that placing a platinum-containing catalytic article downstream from one or more of a TWC catalyst, a LNT, or an integrated LNT-TWC, and immediately upstream of one or more SCR catalytic articles will regulate the amount of $NO_2$ and produce a system that is more stable to sulfur in gasoline. It is thought that the platinum-containing catalytic article prevents degradation of the $NO_x$ reduction performance of the one or more SCR catalytic articles, thus allowing the SCR catalytic article(s) to effectively abate the $NO_x$ emissions.

As used herein, the term "immediately upstream" refers to the relative direction according to the flow of an engine exhaust gas stream from an engine towards a tailpipe. Immediately upstream means that there is no other catalytic material between the platinum-containing catalytic article and the one or more SCR catalytic articles.

In one or more embodiments, the platinum-containing catalytic article 230 (in FIG. 2) comprises platinum dispersed on a high surface area refractory metal oxide support. In one or more embodiments, the high surface area refractory metal oxide support comprises any high surface area refractory metal oxide support known in the art. For example, the high surface area refractory metal oxide support can comprise one or more of alumina, zirconia, silica, titania, ceria, silica-alumina, zirconia-alumina, titania-alumina, lanthana-alumina, lanthana-zirconia-alumina, baria-alumina, baria-lanthana-alumina, baria-lanthana-neodymia-alumina, zirconia-silica, titania-silica, or zirconia-titania, or combinations thereof.

Generally, there are no specific restrictions as far as the platinum content of the platinum-containing catalytic article is concerned. In one or more embodiments the platinum loading is in the range of about 1 $g/ft^3$ to about 100 $g/ft^3$.

In one or more embodiments, the platinum-containing catalytic article 230 (in FIG. 2) further comprises an additional platinum group metal (PGM) selected from Pd, Rh, Ru, Ir, and Os. In such embodiments where the additional PGM is present, platinum is present in an amount of at least 50 wt. % of the total PGM in the platinum-containing catalytic article, including at least 55 wt. %, at least 60 wt. %, at least 65 wt. %, at least 70 wt. %, at least 75 wt. %, at least 80 wt. %, at least 85 wt. %, at least 90 wt. %, and at least 95 wt. % (e.g., about 50 wt. % and about 95 wt. %).

In one or more embodiments, the additional PGM comprises palladium. In such embodiments, platinum is present in an amount of at least 50 wt. % of the total amount of platinum and palladium in the platinum-containing catalytic article, including at least 55 wt. %, at least 60 wt. %, at least 65 wt. %, at least 70 wt. %, at least 75 wt. %, at least 80 wt. %, at least 85 wt. %, at least 90 wt. %, and at least 95 wt. % (e.g., about 55 wt. % to about 95 wt. %). In one or more embodiments, the ratio of Pt:Pd in the platinum-containing catalytic article is in the range of about 100:1 to about 1:0, including the range of about 50:1 to about 5:1, and the range of about 20:1 to about 2:1. In specific embodiments, the ratio of Pt:Pd in the platinum-containing catalytic article is about 10:1.

In one or more embodiments, the platinum-containing catalytic article 230 (in FIG. 2) is on a flow through substrate. In other embodiments, the platinum-containing catalytic article 230 (in FIG. 2) is coated on a particulate filter. The particulate filter can be selected from a gasoline particulate filter or a soot filter. As used herein, the terms "particulate filter" or "soot filter" refer to a filter designed to remove particulate matter from an exhaust gas stream such as soot. Particulate filters include, but are not limited to honeycomb wall flow filters, partial filtration filter, a wire mesh filter, wound fiber filters, sintered metal filters, and foam filters.

In a specific embodiment, the particulate filter is a platinum-containing catalyzed soot filter (CSF). The platinum-containing CSF comprises a substrate coated with a washcoat layer containing platinum for burning off trapped soot and/or oxidizing $NO_2$. The platinum-containing CSF is coated with platinum and one or more high surface area refractory oxide metal oxide supports (e.g., alumina, silica, silica alumina, zirconia, zirconia alumina, and ceria-zirconia) for the combustion of unburned hydrocarbons and, to some degree, particulate matter.

Wall flow substrates useful for supporting the platinum-containing CSF compositions have a plurality of fine, substantially parallel gas flow passages extending along the longitudinal axis of the substrate. Typically, each passage is blocked at one end of the substrate body, with alternate passages blocked at opposite end-faces. Such monolithic substrates may contain up to about 900 or more flow passages (or "cells") per square inch of cross section, although far fewer may be used. For example, the substrate may have from about 7 to 600, more usually from about 100 to 400, cells per square inch ("cpsi"). The porous wall flow filter used in embodiments of the invention can be catalyzed in that the wall of said element has thereon or contained therein platinum, such platinum-containing CSF catalyst compositions are described hereinabove. Platinum-containing catalytic materials may be present on the inlet side of the element wall alone, the outlet side alone, both the inlet and outlet sides, or the wall itself may consist all, or in part, of the platinum-containing catalytic material. In another embodiment, this invention may include the use of one or more washcoat layers of platinum-containing catalytic materials and combinations of one or more washcoat layers of platinum-containing catalytic materials on the inlet and/or outlet walls of the element.

Figure 3:
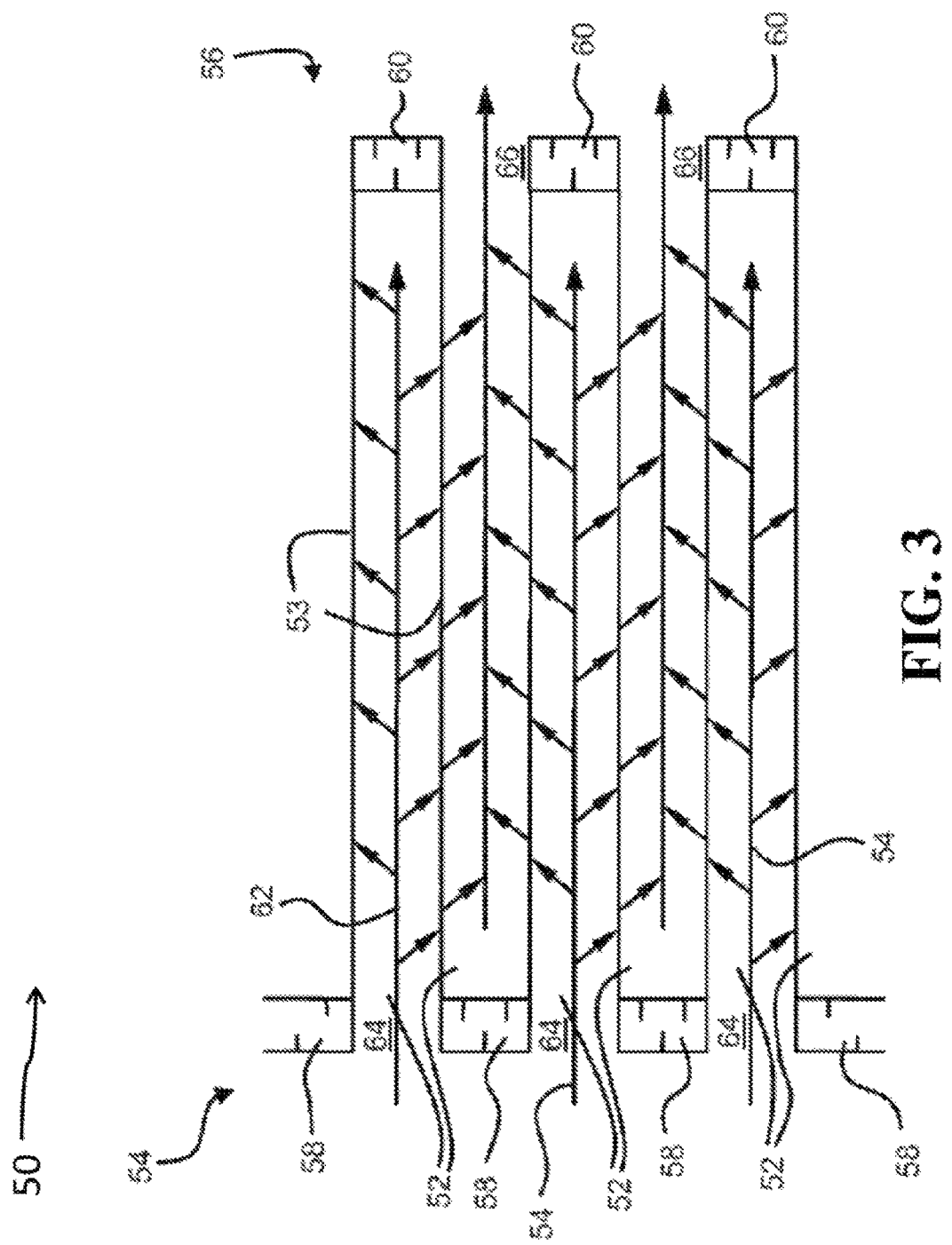
FIG. 3 shows a cross-sectional view of a section of a wall flow filter substrate.

FIG. 3 illustrates a wall flow filter substrate 50 which has a plurality of passages 52. The passages are tubularly enclosed by the channel walls 53 of the filter substrate. The substrate has an inlet end 54 and an outlet end 56. Alternate passages are plugged at the inlet end with inlet plugs 58, and at the outlet end with outlet plugs 60 to form opposing checkerboard patterns at the inlet end 54 and outlet end 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58.

Figure 4:
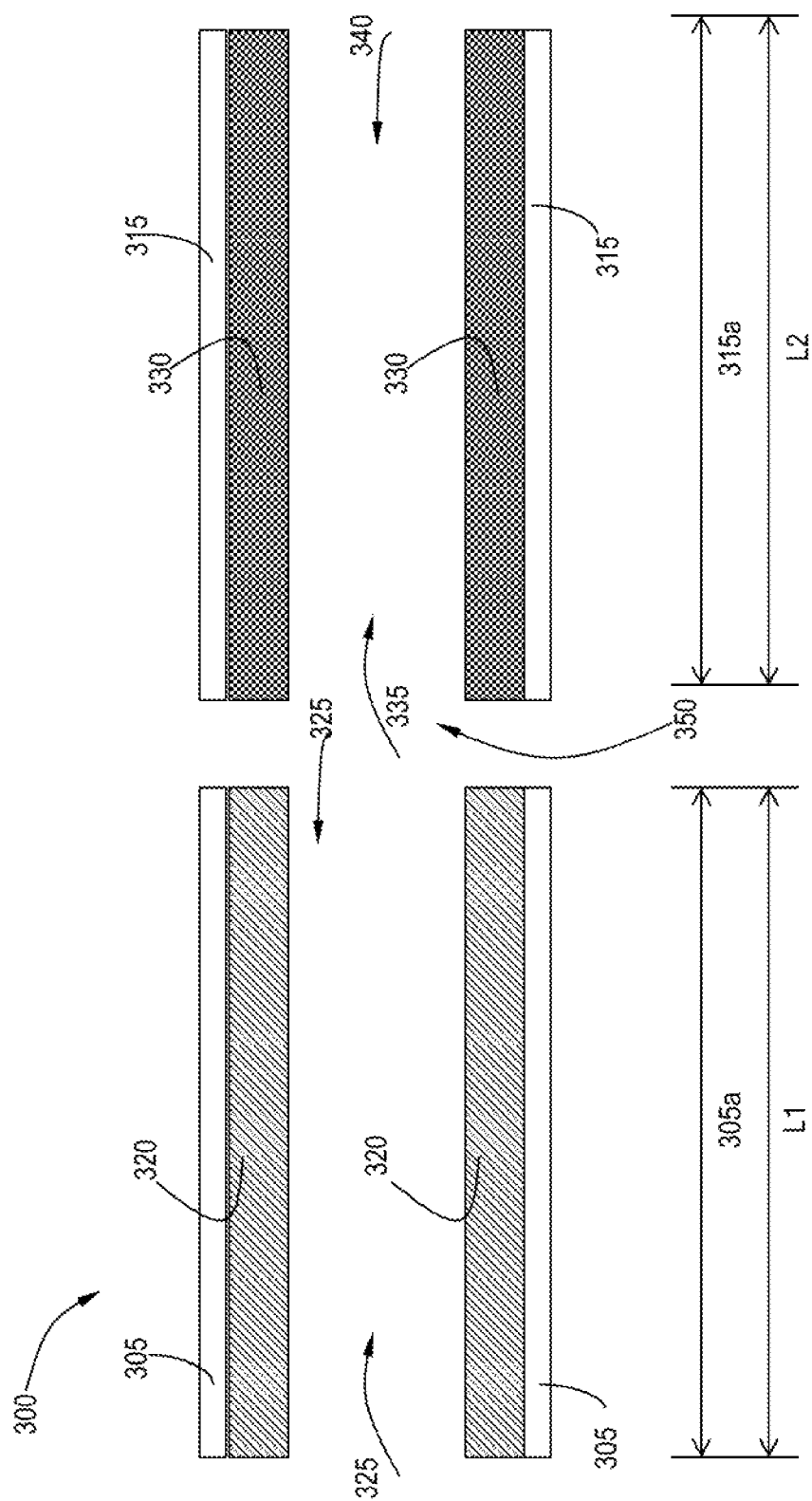
FIG. 4 shows a partial cross-sectional view of catalytic article system according to one or more embodiments.

Referring to FIG. 2, in one or more embodiments, the one or more catalytic articles 220 selected from a TWC catalyst, a LNT, and an integrated LNT-TWC and the platinum-containing catalytic article 230 are on separate substrates. Embodiments where the one or more catalytic articles 220 and the platinum containing catalytic article 230 are on separate substrates are more specifically illustrated in FIG. 4. Referring to FIG. 4, part of the exhaust gas system 300 shown is an axially zoned arrangement where the one or more catalytic articles 320 selected from a TWC catalyst, a LNT, or an integrated LNT-TWC is located upstream of the platinum-containing catalytic article 330 and the catalytic articles 320 and platinum-containing catalytic article 330 are on separate substrates, namely, a first substrate 305 and a second substrate 315. The one or more catalytic articles 320 selected from a TWC catalyst, a LNT, or an integrated LNT-TWC is disposed on a first substrate 305, and the platinum-containing catalytic article 330 is disposed on a separate second substrate 315. The first and second substrates 305 and 315 can be comprised of the same material or a different material. The first substrate 305 has an inlet end 325 and an outlet end 330 defining an axial length L1. The second substrate 315 has an inlet end 335 and an outlet end 340 defining an axial length L2. In one or more embodiments, the first and second substrates 305 and 315 generally comprise a plurality of channels 350 of a honeycomb substrate, of which only one channel is shown in cross-section for clarity. The one or more catalytic articles 320 selected from a TWC catalyst, a LNT, or an integrated LNT-TWC extends from the inlet end 325 of the first substrate 305 through the entire axial length L1 of the first substrate 305 to the outlet end 325. The length of the one or more catalytic articles 320 is denoted as first zone length 305*a* in FIG. 4. The platinum-containing catalytic article 330 extends from the outlet end 335 of the second substrate 315 through the entire axial length L2 of the second substrate 315 to the inlet end 340. The platinum-containing catalytic article 330 defines a second zone length 315*a* in FIG. 4. It will be appreciated that the length of substrate 305*a* and the length of substrate 315*a* can be varied.

Referring to FIG. 2, in one or more embodiments, the one or more catalytic articles 220 selected from a TWC catalyst, a LNT, and an integrated LNT-TWC and the platinum-containing catalytic article 230 are on a single substrate. On a single substrate, the designs can include zoned and layered systems. In embodiments where the one or more catalytic articles 220 and the platinum containing catalytic article 230 are on single substrate in a layered relationship, the platinum-containing catalytic article is coated on a substrate to form a first layer (or bottom coat), and the one or more catalytic articles 220 are washcoated on top of the first layer to form a second layer (or top coat). It will be appreciated by one of skill in the art that the top coat/second layer of the one or more catalytic articles is upstream of the bottom coat/first layer of the platinum-containing catalytic article.

In one or more embodiments, the substrate comprises a flow-through honeycomb monolith, and the catalytic material(s) are applied to the substrate as a washcoat. As used herein, the term "substrate" refers to the monolithic material onto which the catalyst material is placed, typically in the form of a washcoat. A washcoat is formed by preparing a slurry containing a specified solids content (e.g., about 30-90% by weight) of catalyst in a liquid vehicle, which is then coated onto a substrate and dried to provide a washcoat layer. As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated.

In one or more embodiments, the substrate is a ceramic or metal having a honeycomb structure. Any suitable substrate may be employed, such as a monolithic substrate of the type having fine, parallel gas flow passages extending there through from an inlet or an outlet face of the substrate such that passages are open to fluid flow therethrough. The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e. cells) per square inch of cross section.

The metallic substrate may include any metallic substrate, such as those with openings or "punch-outs" in the channel walls.

The ceramic substrate may be made of any suitable refractory material, e.g. cordierite, cordierite-α-alumina, silicon nitride, zircon mullite, spodumene, alumina-silica-magnesia, zircon silicate, sillimanite, a magnesium silicate, zircon, petalite, α-alumina, an aluminosilicate and the like.

The substrates useful for the catalyst materials of embodiments of the present invention may also be metallic in nature and be composed of one or more metals or metal alloys. The metallic substrates may be employed in various shapes such as pellets, corrugated sheet or monolithic form. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt. % of the alloy, for instance, about 10 to 25 wt. % chromium, about 1 to 8 wt. % of aluminum, and about 0 to 20 wt. % of nickel.

In one or more embodiments, the one or more catalytic articles selected from a TWC catalyst, a LNT, and an integrated LNT-TWC and the platinum-containing catalytic article are arranged in an axially zoned configuration. As used herein, the term "axially zoned" refers to the location of the upstream zone and downstream zone relative to one another. Axially means side-by-side, such that the upstream zone and the downstream zone are located one beside the other.

Figure 5:
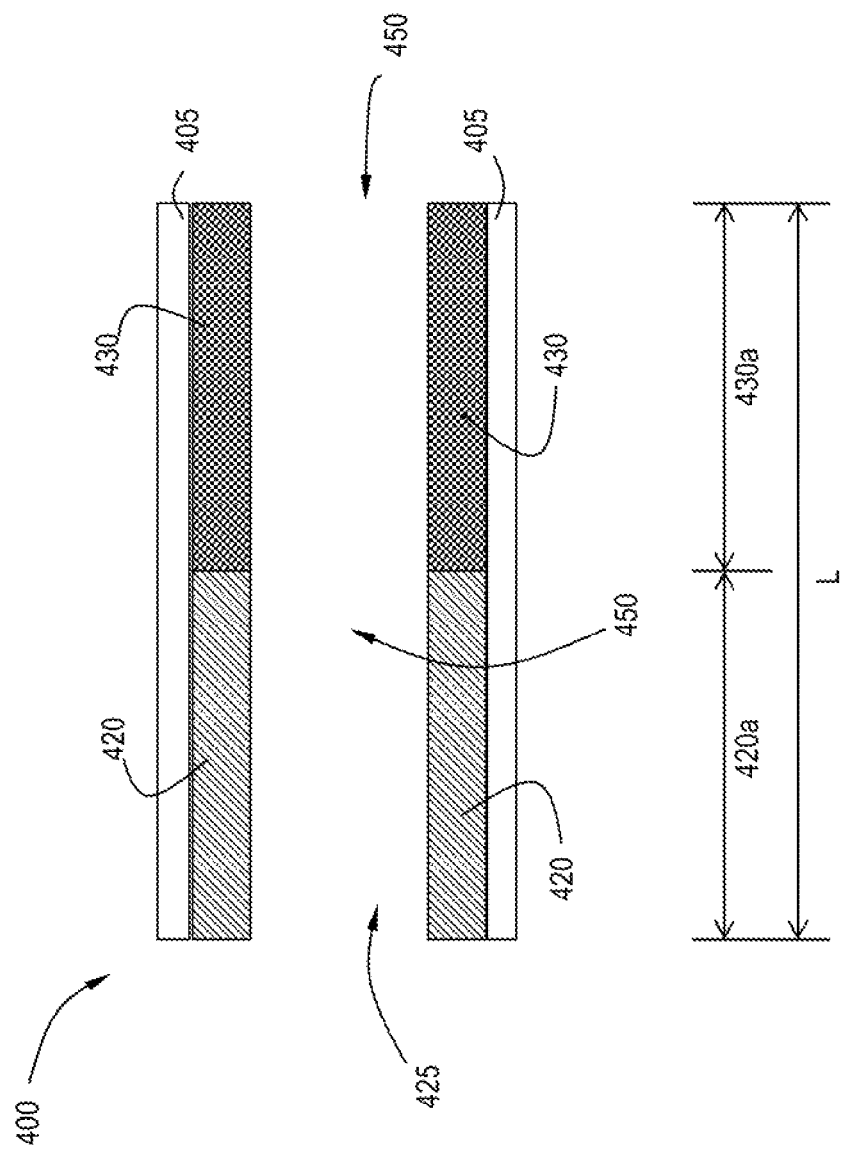
FIG. 5 shows a partial cross-sectional view of catalytic article system according to one or more embodiments.

Referring to FIG. 2, in one or more embodiments, the one or more catalytic articles 220 selected from a TWC catalyst, a LNT, and an integrated LNT-TWC and the platinum-containing catalytic article 230 are on a common substrate in an axially zoned configuration, wherein the one or more catalytic articles 220 is upstream of the platinum-containing catalytic article 230. Such embodiments may be more readily understood with reference to FIG. 5. Referring to FIG. 5, an exemplary embodiment of an axially zoned system 400 is shown. The one or more catalytic articles 420 selected from a TWC catalyst, a LNT, and an integrated LNT-TWC is located upstream of the platinum-containing catalytic article 430 on a common substrate 405. The substrate 405 has an inlet end 425 and an outlet end 435 defining an axial length L. In one or more embodiments, the substrate 405 generally comprises a plurality of channels 450 of a honeycomb substrate, of which only one channel is shown in cross-section for clarity. The one or more catalytic articles 420 selected from a TWC catalyst, a LNT, and an integrated LNT-TWC extends from the inlet end 425 of the substrate 405 through less than the entire axial length L of the substrate 405. The length of the one or more catalytic articles 420 is denoted as first zone length 420a in FIG. 5. The platinum-containing catalytic article 430 extends from the outlet end 435 of the substrate 405 through less than the entire axial length L of the substrate 405. The length of the platinum-containing catalytic article 430 is denoted as the second zone length 430a in FIG. 5.

In one or more embodiments, as illustrated in FIG. 5, the one or more catalytic articles 420 is directly abutting the platinum-containing catalytic article 430. In still further embodiments, there may be a gap between the one or more catalytic articles 420 and the platinum-containing catalytic article 420 (not illustrated). It will be appreciated by one skilled in the art that the one or more catalytic articles 420 and platinum-containing catalytic article 430 can be at least partially overlapping (not illustrated). In one or more embodiments, the one or more catalytic articles 420 is at least partially overlapping the platinum-containing catalytic article 430. In other embodiments, the platinum-containing catalytic article 430 is at least partially overlapping the one or more catalytic articles 420.

Selective Catalytic Reduction (SCR) Catalytic Articles:

In one or more embodiments, the exhaust gas system comprises one or more selective catalytic reduction (SCR) catalytic articles 240 (in FIG. 2) immediately downstream from the platinum-containing catalytic article 230, the one or more SCR catalytic articles 240 including a molecular sieve.

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" and "$NO_x$" designate the oxides of nitrogen, especially dinitrogen oxide ($N_2O$), nitrogen monoxide (NO), dinitrogen trioxide ($N_2O_3$), nitrogen dioxide ($NO_2$), dinitrogen tetroxide ($N_2O_4$), dinitrogen pentoxide ($N_2O_5$), and nitrogen peroxide ($NO_3$).

As used herein, the term "immediately downstream" refers to the relative direction according to the flow of an engine exhaust gas stream from an engine toward a tailpipe. Immediately downstream means that there are no other catalytic materials between the platinum-containing catalytic article and the one or more SCR catalytic articles.

As used herein, the phrase "molecular sieve" refers to framework materials such as zeolites and other framework materials (e.g. isomorphously substituted materials), which may in particulate form in combination with one or more promoter metals be used as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, including silicon and aluminum atoms. According to one or more embodiments, it will be appreciated that by defining the molecular sieves by their framework type, it is intended to include the framework type and any and all isotypic framework materials such as SAPO, ALPO and MeAPO materials having the same framework type as the zeolite materials.

In more specific embodiments, reference to an aluminosilicate zeolite framework type limits the material to molecular sieves that do not include phosphorus or other metals substituted in the framework. However, to be clear, as used herein, "aluminosilicate zeolite" excludes aluminophosphate materials such as SAPO, ALPO, and MeAPO materials, and the broader term "zeolite" is intended to include aluminosilicates and aluminophosphates. Zeolites are crystalline materials having rather uniform pore sizes which, depending upon the type of zeolite and the type and amount of cations included in the zeolite lattice, range from about 3 to 10 Angstroms in diameter. Zeolites generally comprise silica to alumina (SAR) molar ratios of 2 or greater.

The term "aluminophosphates" refers to another specific example of a molecular sieve, including aluminum and phosphate atoms. Aluminophosphates are crystalline materials having rather uniform pore sizes.

Generally, molecular sieves, e.g. zeolite, are defined as aluminosilicates with open 3-dimensional framework structures composed of corner-sharing $TO_4$ tetrahedra, where T is Al or Si, or optionally P. Cations that balance the charge of the anionic framework are loosely associated with the framework oxygens, and the remaining pore volume is filled with water molecules. The non-framework cations are generally exchangeable, and the water molecules removable.

In one or more embodiments, the molecular sieve materials, independently, comprise $SiO_4/AlO_4$ tetrahedra and are linked by common oxygen atoms to form a three-dimensional network. In other embodiments, the molecular sieve materials comprise $SiO_4/AlO_4/PO_4$ tetrahedra. The molecular sieve materials of one or more embodiments can be differentiated mainly according to the geometry of the voids which are formed by the rigid network of the $(SiO_4)/AlO_4$, or $SiO_4/AlO_4/PO_4$, tetrahedra. The entrances to the voids are formed from 6, 8, 10, or 12 ring atoms with respect to the atoms which form the entrance opening. In one or more embodiments, the molecular sieve materials comprise ring sizes of no larger than 12, including 6, 8, 10, and 12.

According to one or more embodiments, the molecular sieve materials can be based on the framework topology by which the structures are identified. Typically, any framework type of zeolite can be used, such as framework types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, ISV, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof.

In one or more embodiments, the molecular sieve materials comprise an 8-ring small pore aluminosilicate zeolite. As used herein, the term "small pore" refers to pore openings, which are smaller than about 5 Angstroms, for example on the order of ~3.8 Angstroms. The phrase "8-ring" zeolites refers to zeolites having 8-ring pore openings and double-six ring secondary building units and having a cage like structure resulting from the connection of double six-ring building units by 4 rings. Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic framework types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN.

In one or more embodiments, the molecular sieve materials comprise a d6r unit. Thus, in one or more embodiments, the molecular sieve materials have a framework type selected from AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, WEN, and combinations thereof. In other specific embodiments, the molecular sieve materials have a framework type selected from the group consisting of CHA, AEI, AFX, ERI, KFI, LEV, and combinations thereof. In still further specific embodiments, the molecular sieve materials have a framework type selected from CHA, AEI, and AFX. In one or more very specific embodiments, the molecular sieve materials have the CHA framework type.

Zeolitic CHA-framework type molecular sieves includes a naturally occurring tectosilicate mineral of a zeolite group with approximate formula: $(Ca,Na_2,K_2,Mg)Al_2Si_4O_{12} \cdot 6H_2O$ (e.g., hydrated calcium aluminum silicate). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic CHA framework type, SSZ-13, is described in U.S. Pat. No. 4,544,538, which is hereby incorporated by reference. Synthesis of a synthetic form of a molecular sieve having the CHA framework type, silicoaluminophosphate 34 (SAPO-34), is described in U.S. Pat. No. 4,440,871 and U.S. Pat. No. 7,264,789, which are hereby incorporated by reference. A method of making yet another synthetic molecular sieve having the CHA framework type, SAPO-44, is described in U.S. Pat. No. 6,162,415, which is hereby incorporated by reference.

In one or more embodiments, the molecular sieve materials can include all aluminosilicate, borosilicate, gallosilicate, MeAPSO, and MeAPO compositions. These include, but are not limited to SSZ-13, SSZ-62, natural chabazite, zeolite K-G, Linde D, Linde R, LZ-218, LZ-235. LZ-236, ZK-14, SAPO-34, SAPO-44, SAPO-47, ZYT-6, CuSAPO-34, CuSAPO-44, and CuSAPO-47.

The ratio of silica to alumina of an aluminosilicate molecular sieve component can vary over a wide range. In one or more embodiments, the molecular sieve materials, have a silica to alumina molar ratio (SAR) in the range of 2 to 300, including 5 to 250; 5 to 200; 5 to 100; and 5 to 50. In one or more specific embodiments, the molecular sieve materials, have a silica to alumina molar ratio (SAR) in the range of 10 to 200, 10 to 100, 10 to 75, 10 to 60, and 10 to 50; 15 to 100, 15 to 75, 15 to 60, and 15 to 50; 20 to 100, 20 to 75, 20 to 60, and 20 to 50.

As used herein, the term "promoted" refers to a component that is intentionally added to the molecular sieve material, as opposed to impurities inherent in the molecular sieve. Thus, a promoter is intentionally added to enhance activity of a catalyst compared to a catalyst that does not have promoter intentionally added. In order to promote the SCR of oxides of nitrogen, in one or more embodiments, suitable metal(s) is independently exchanged into the molecular sieve. According to one or more embodiments, the molecular sieve is promoted with one or more of copper (Cu), iron (Fe), cobalt (Co), nickel (Ni), lanthanum (La), cerium (Ce), manganese (Mn), vanadium (V), or silver (Ag). In specific embodiment, the molecular sieve is promoted with one or more of copper (Cu) or iron (Fe). In very specific embodiments, the molecular sieve is promoted with Cu.

The promoter metal content of the catalyst, calculated as the oxide, is, in one or more embodiments, at least about 0.1 wt. %, reported on a volatile-free basis. In specific embodiments, the promoter metal content, calculated as the oxide, is in the range of about 0.1 wt. % up to about 10 wt. %, including 9, 8, 7, 6, 5, 4, 3, 2, 1, 0.5, 0.25, and 0.1 wt. %, in each case based on the total weight of the calcined molecular sieve reported on a volatile free basis.

In specific embodiments, the promoter metal comprises Cu, and the Cu content, calculated as CuO is in the range of about 0.1 wt. % up to about 5 wt. %, including 5, 4, 3, 2, 1, 0.5, 0.25, and 0.1 wt. %, in each case based on the total weight of the calcined molecular sieve reported on a volatile free basis. In specific embodiments, the Cu content of the molecular sieve, calculated as CuO, is in the range of about 2 to about 5 wt. %.

In one or more embodiments, the exhaust gas system further comprises an ammonia oxidation (AMOx) catalyst downstream of the one or more SCR catalytic articles 240 (in FIG. 2). The ammonia oxidation catalyst may be provided downstream of the SCR catalytic article(s) 240 to remove any slipped ammonia from the exhaust gas treatment system. In one or more embodiments, the one or more SCR catalytic articles is on a substrate having an inlet and an outlet, and includes an ammonia oxidation (AMOx) catalyst at the outlet. In specific embodiments, the AMOx catalyst may comprise a platinum group metal such as platinum, palladium, rhodium, or combinations thereof. In one or more embodiments, the AMOx catalyst may comprise a bottom coat with PGM and a top coat with SCR functionality.

Such AMOx catalysts are useful in exhaust gas treatment systems including an SCR catalyst. As discussed in commonly assigned U.S. Pat. No. 5,516,497, the entire content of which is incorporated herein by reference, a gaseous stream containing oxygen, nitrogen oxides, and ammonia can be sequentially passed through first and second catalysts, the first catalyst favoring reduction of nitrogen oxides and the second catalyst favoring the oxidation or other decomposition of excess ammonia. Thus, the first catalysts can be the SCR catalytic article, and the second catalyst can be an AMOx catalyst and/or SCR+AMOx integrated catalyst, optionally comprising a zeolite.

AMOx catalyst composition(s) can be coated on a flow through or wall-flow filter. If a wall flow substrate is utilized, the resulting system will be able to remove particulate matter along with gaseous pollutants. The wall-flow filter substrate can be made from materials commonly known in the art, such as cordierite, aluminum titanate or silicon carbide. It will be understood that the loading of the catalytic composition on a wall flow substrate will depend on substrate properties such as porosity and wall thickness, and typically will be lower than loading on a flow through substrate.

Accordingly, in one or more specific embodiments, provided is an exhaust gas system for treatment of a gasoline engine exhaust gas stream containing $NO_x$, particulate matter and sulfur, the system comprising: a three-way conversion (TWC) catalyst; a catalyzed soot filter containing platinum downstream from three-way catalyst; a first selective catalytic reduction (SCR) catalytic article immediately downstream from the catalyzed soot filter; and a second selective catalytic reduction catalyst (SCR) immediately downstream from the catalyzed soot filter; wherein the first and second SCR catalytic articles independently include a molecular sieve. In one or more embodiments, the exhaust gas system may further comprise a LNT upstream of the TWC. In other embodiments, the exhaust gas system may further comprise a LNT downstream of the TWC.

Method of Treating Engine Exhaust:

Another aspect of the present invention is directed to a method of treating the exhaust gas stream of an engine. In one or more embodiments, a method for treatment of an engine exhaust gas stream of a gasoline engine containing particulate matter, ammonia, $NO_x$, and sulfur, comprises flowing the engine exhaust gas stream over one or more catalytic articles selected from a three-way conversion (TWC) catalyst, a lean $NO_x$ trap (LNT), and integrate LNT-TWC; directing the exhaust gas stream containing particulate matter, $NO_x$, sulfur and ammonia through a platinum-containing catalytic article; and directing the exhaust gas that has passed through the platinum-containing catalytic article through one or more selective catalytic reduction articles including a molecular sieve and a promoter metal.

The invention is now described with reference to the following examples. Before describing several exemplary embodiments of the invention, it is to be understood that the invention is not limited to the details of construction or process steps set forth in the following description. The invention is capable of other embodiments and of being practiced or being carried out in various ways.

EXAMPLES

Example 1—Preparation of Platinum-Containing CSF

A catalyzed soot filter having platinum was prepared using an inlet coat and an outlet coat. The platinum-containing catalytic material contained platinum and palladium in a ratio of 10:1 and a total platinum group metal loading of 25 g/ft$^3$.

Example 2—SCR Catalysts

Two SCR catalysts were obtained. The first SCR catalyst was a commercially available fresh CuCHA SCR catalyst on a flow through substrate. A second SCR catalyst was identical to the first SCR Catalyst, except that this catalyst was sulfated with a sulfur loading of about 1% by weight of $SO_3$ including the weight of the substrate.

Example 3—Testing of Exhaust System with Fresh SCR Catalyst

A Pd-only three-way catalyst on a flow through substrate was placed upstream from a Pd—Rh TWC catalyst on flow through substrate, and these TWC catalysts were placed upstream of the Example 2 catalyst. The fresh CuCHA SCR catalyst was placed downstream from the Example 1 Catalyst. This was system tested according to Federal Test Protocol 72 on a gasoline engine simulator.

Example 4—Testing of Exhaust System with Sulfated SCR Catalyst

A Pd-only three-way catalyst on a flow through substrate was placed upstream from a Pd—Rh TWC catalyst on flow through substrate, and these TWC catalysts were placed upstream of the Example 2 catalyst. The sulfated CuCHA SCR catalyst was placed downstream from the Example 1 Catalyst. This was system tested according to Federal Test Protocol 72 on a gasoline engine simulator.

Comparative Example 5—Testing of Exhaust System without Platinum Containing Catalyst with Fresh SCR Catalyst Example 3 was repeated, except the Example 2 catalyst was replaced with a bare, uncatalyzed filter. This was system tested according to Federal Test Protocol 72 on a gasoline engine simulator.

Comparative Example 6—Testing of Exhaust System without Platinum Containing Catalyst with Sulfated SCR Catalyst Example 4 was repeated, except the Example 2 catalyst was replaced with a bare, uncatalyzed filter. This was system tested according to Federal Test Protocol 72 on a gasoline engine simulator.

NOx conversion data over the entire system was obtained. Table 1 below shows the results for Examples 3-6. As shown in Table 1 below, the system with the platinum containing catalyst upstream of the sulfated SCR catalyst had the best NOx conversion performance. However, Examples 5 and 6, which did not include a platinum containing catalyst, showed a degradation in NOx conversion performance of Example 6, when compared with Example 5.

TABLE 1

| Example # | $NO_x$ Conversion |
| --- | --- |
| 3 | 93.5 |
| 4 | 94.3 |

TABLE 1-continued

| Example # | NO$_x$ Conversion |
|---|---|
| 5 | 91.6 |
| 6 | 83.2 |

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed is:

1. An exhaust gas system for treatment of a gasoline engine exhaust gas stream containing NO$_X$, particulate matter, and sulfur, the system comprising:
    at least one catalytic article selected from a three-way conversion (TWC) catalyst, TWC catalyst and a lean NO$_x$ trap (LNT), and an integrated LNT-TWC;
    a platinum-containing catalytic article downstream from the at least one catalytic article; and
    a selective catalytic reduction (SCR) catalytic article immediately downstream from the platinum-containing catalytic article, the SCR catalytic article including a molecular sieve.

2. The exhaust gas system of claim 1, wherein the at least one catalytic article and the platinum-containing catalytic article are on a single substrate.

3. The exhaust gas system of claim 1, wherein the platinum-containing catalyst is on a particulate filter.

4. The exhaust gas system of claim 3, wherein the particulate filter is a wall-flow filter.

5. The exhaust gas system of claim 1, wherein the platinum-containing catalyst is on a flow through substrate.

6. The exhaust gas system of claim 1, wherein the platinum-containing catalytic article further comprises an additional platinum group metal (PGM) selected from Pd, Rh, Ru, Ir, and Os, and wherein the platinum is present in an amount of at least 50 wt. % of the total PGM in the platinum-containing catalytic article.

7. The exhaust gas treatment system of claim 6, wherein the additional platinum group metal is palladium.

8. The exhaust gas system of claim 1, further comprising an ammonia oxidation (AMOx) catalyst downstream of the SCR catalytic article.

9. The exhaust gas system of claim 8, wherein the SCR catalytic article is on a substrate having an inlet and an outlet, and the AMOx catalyst is at the outlet.

10. The exhaust gas system of claim 1, wherein the gasoline engine is a lean gasoline direct injection (GDI) engine.

11. The exhaust gas treatment system of any of claim 1, wherein the one or more catalytic articles generate NH$_3$ when the gasoline engine exhaust gas stream is rich.

12. The exhaust gas treatment system of claim 1, wherein the molecular sieve is a molecular sieve that has a double six-ring (d6r) unit.

13. The exhaust gas system of claim 12, wherein the molecular sieve is selected from the group consisting of the framework type AEI, AFT, AFX, CHA, EAB, EMT, ERI, FAU, GME, JSR, KR, LEV, LTL, LTN, MOZ, MSO, MWW, OFF, SAS, SAT, SAV, SBS, SBT, SFW, SSF, SZR, TSC, WEN, and combinations thereof.

14. The exhaust gas treatment system of claim 13, wherein the molecular sieve is selected from the group consisting of the framework type AEI, AFT, AFX, CHA, EAB, ERI, KR, LEV, SAS, SAT, and SAV.

15. The exhaust gas treatment system of claim 14, wherein the molecular sieve is selected from the group consisting of the framework type AEI, CHA, and AFX.

16. The exhaust gas treatment system of claim 15, wherein the molecular sieve is the CHA framework type.

17. The exhaust gas treatment system of claim 16, wherein the CHA framework type molecular sieve is selected from an aluminosilicate zeolite, a borosilicate, a gallosilicate, a SAPO, an AlPO, a MeAPSO, and a MeAPO.

18. The exhaust gas treatment system of claim 17, wherein the CHA framework type molecular sieve is selected from the group consisting of SSZ-13, SSZ-62, chabazite, zeolite K-G, Linde D, Linde R, LZ-218, LZ-235, LZ-236, ZK-14, SAPO-34, SAPO-44, SAPO-47, and ZYT-6.

19. The exhaust gas treatment system of claim 18, wherein the molecular sieve is selected from SSZ-13 and SSZ-62.

20. The exhaust gas treatment system of claim 12, wherein the molecular sieve is promoted with a metal selected from Cu, Fe, Co, Ni, La, Ce, Mn, V, Ag, and combinations thereof.

21. The exhaust gas treatment system of claim 20, wherein the molecular sieve is promoted with a metal selected from Cu, Fe, and combinations thereof.

22. The exhaust gas treatment system of claim 20, wherein the molecular sieve is promoted with Cu.

23. An exhaust gas system for treatment of a gasoline engine exhaust gas stream containing
    NO$_X$, particulate matter and sulfur, the system comprising:
    a three-way conversion (TWC) catalyst;
    a catalyzed soot filter containing platinum downstream from the TWC catalyst;
    a first selective catalytic reduction (SCR) catalyst immediately downstream from the catalyzed soot filter; and
    a second selective catalytic reduction (SCR) catalyst immediately downstream from the first SCR catalytic article; and wherein the first and second SCR catalytic articles each independently include a molecular sieve.

24. A method for treatment of an engine exhaust gas stream of a lean burn engine containing particulate matter, ammonia, NO$_x$, and sulfur, the method comprising:
    flowing the engine exhaust gas stream over at least one catalytic article selected from a three-way conversion (TWC) catalyst, TWC catalyst and a lean NO$_x$ trap (LNT), and an integrated LNT-TWC;

directing the exhaust gas stream exiting the at least one catalytic article containing particulate matter, $NO_x$, sulfur, and ammonia through a platinum-containing catalytic article; and directing the exhaust gas exiting the platinum-containing catalytic article through a selective catalytic reduction (SCR) article including a molecular sieve and a promoter metal.

25. The method of claim 24, wherein the at least one catalytic article consists of a TWC.

26. The method of claim 24, wherein the molecular sieve comprises an aluminosilicate zeolite having a double six-ring (d6r) unit.

27. The method of claim 26, wherein the zeolite is a CHA framework type zeolite promoted with copper.

* * * * *